US012107822B1

United States Patent
Li et al.

(10) Patent No.: US 12,107,822 B1
(45) Date of Patent: Oct. 1, 2024

(54) USING A SOURCE NETWORK ADDRESS TRANSLATION (SNAT) PORT TO FACILITATE MULTIPLE QUERIES

(71) Applicant: International Business Machines Corporation, Armonk, NY (US)

(72) Inventors: Chen Li, Shanghai (CN); Gang Tang, Nanjing (CN); ShiMing Qu, Beijing (CN); Kai Hong Du, Shanghai (CN); Guo Chun Bian, Wuxi (CN); Umesh chandra Sahoo, Bhubaneswar (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/237,295

(22) Filed: Aug. 23, 2023

(51) Int. Cl.
*H04L 61/4511* (2022.01)
*G06F 16/903* (2019.01)
*H04L 61/2517* (2022.01)

(52) U.S. Cl.
CPC .... *H04L 61/4511* (2022.05); *G06F 16/90339* (2019.01); *H04L 61/2517* (2013.01)

(58) Field of Classification Search
CPC ............. H04L 61/4511; H04L 61/2517; G06F 16/90339
See application file for complete search history.

(56) References Cited

U.S. PATENT DOCUMENTS

| | | | |
|---|---|---|---|
| 7,131,141 B1 * | 10/2006 | Blewett | H04L 63/0209 713/153 |
| 8,291,116 B2 | 10/2012 | Read | |
| 9,083,587 B2 * | 7/2015 | Babu | H04L 61/2514 |
| 9,124,538 B2 * | 9/2015 | Koponen | H04L 45/38 |
| 10,263,951 B2 | 4/2019 | Kielhofner et al. | |
| 11,233,858 B2 | 1/2022 | Asveren et al. | |
| 11,606,225 B2 * | 3/2023 | Cidon | H04L 41/0894 |
| 2016/0380966 A1 | 12/2016 | Gunnalan et al. | |
| 2021/0029035 A1 | 1/2021 | Lynch et al. | |
| 2022/0021615 A1 | 1/2022 | Boutros et al. | |
| 2022/0231944 A1 * | 7/2022 | Jindal | H04L 45/74 |

FOREIGN PATENT DOCUMENTS

| | | |
|---|---|---|
| CN | 115378868 A | 11/2022 |
| KR | 102200402 B1 | 1/2021 |

OTHER PUBLICATIONS

4lowTheRabbit, "SNAT with App Service," 4lowTheRabbit.github.io, 2019, 9 pages, retrieved from https://4lowtherabbit.github.io/blogs/2019/10/SNAT/.

(Continued)

*Primary Examiner* — Nazia Naoreen
(74) *Attorney, Agent, or Firm* — Zilka-Kotab, P.C.

(57) ABSTRACT

A computer-implemented method, according to one approach, includes: determining whether a destination for a domain name system (DNS) query corresponds to an existing source network address translation (SNAT) port in response to receiving the DNS query. In response to determining that the destination for the DNS query corresponds to an existing SNAT port, the DNS query is modified to incorporate the existing SNAT port. A map entry corresponding to the existing SNAT port is also updated, and the modified DNS query is satisfied. Other systems, methods, and computer program products are described in additional approaches.

19 Claims, 11 Drawing Sheets

(56) References Cited

OTHER PUBLICATIONS

Microsoft, "Use Source Network Address Translation (SNAT) for outbound connections," Microsoft Azure, Jun. 19, 2023, 10 pages, retrieved from https://learn.microsoft.com/en-us/azure/load-balancer/load-balancer-outbound-connections.

Littleton, A., "Dive deep into NAT gateway's SNAT port behavior," Microsoft Azure, Aug. 18, 2022, 7 pages, retrieved from https://azure.microsoft.com/en-us/blog/dive-deep-into-nat-gateway-s-snat-port-behavior/.

* cited by examiner

USING A SOURCE NETWORK ADDRESS TRANSLATION (SNAT) PORT TO FACILITATE MULTIPLE QUERIES

BACKGROUND

The present invention relates to software-defined network systems, and more specifically, this invention relates to using SNAT ports to facilitate multiple queries in parallel.

As computing power continues to advance and the use of IoT devices becomes more prevalent, the amount of data produced continues to increase. For instance, the rise of smart enterprise endpoints has led to large amounts of data being generated at remote locations. Data production will only further increase with the growth of 5G networks and an increased number of connected mobile devices. This issue has also become more prevalent as the complexity of machine learning models increases. Increasingly complex machine learning models translate to more intense workloads and increased strain associated with applying the models to received data.

Cloud computing has been implemented in an effort to improve the ability to process this increasing amount of data. For instance, cloud computing includes both public and private connections. A public connection makes computing resources (e.g., software applications, virtual machines, infrastructures, development platforms, etc.) available to users over a public connection to a network. Public cloud architectures are thereby multi-tenant environments in which users share a pool of virtual resources. Workloads originating from multiple different users might thereby be running on a shared physical server at the same time.

In contrast, a virtual private cloud (VPC) is a type of public cloud offering that allows for a private cloud-like computing environment to be established on shared public cloud infrastructure. A VPC thereby provides users the ability to define and control a virtual network that is logically isolated from all other public cloud tenants, thereby creating a private and secure place on the public cloud.

In a VPC, resources from a public cloud may thereby be deployed to create an isolated virtual network. For instance, these public cloud resources (also known as "logical instances") that can be used to form a VPC include compute resources, storage resources, and networking resources. According to an example, compute resources include virtual server instances (VSIs) or "virtual servers" that are presented to a user as virtual CPUs (vCPUs) with a desired amount of computing power, memory, etc. A VPC may thereby be configured to provide a user access to a virtual compute environment capable of operating as desired.

SUMMARY

A computer-implemented method, according to one approach, includes: determining whether a destination for a domain name system (DNS) query corresponds to an existing source network address translation (SNAT) port in response to receiving the DNS query. In response to determining that the destination for the DNS query corresponds to an existing SNAT port, the DNS query is modified to incorporate the existing SNAT port. A map entry corresponding to the existing SNAT port is also updated, and the modified DNS query is satisfied.

A computer program product, according to another approach, includes a computer readable storage medium having program instructions embodied therewith. The program instructions are readable by a processor, executable by the processor, or readable and executable by the processor, to cause the processor to: perform the foregoing method.

A system, according to yet another approach, includes: a processor, as well as logic that is integrated with the processor, executable by the processor, or integrated with and executable by the processor. Moreover, the logic is configured to: perform the foregoing method.

Other aspects and implementations of the present invention will become apparent from the following detailed description, which, when taken in conjunction with the drawings, illustrate by way of example the principles of the invention.

DETAILED DESCRIPTION

Figure 1:
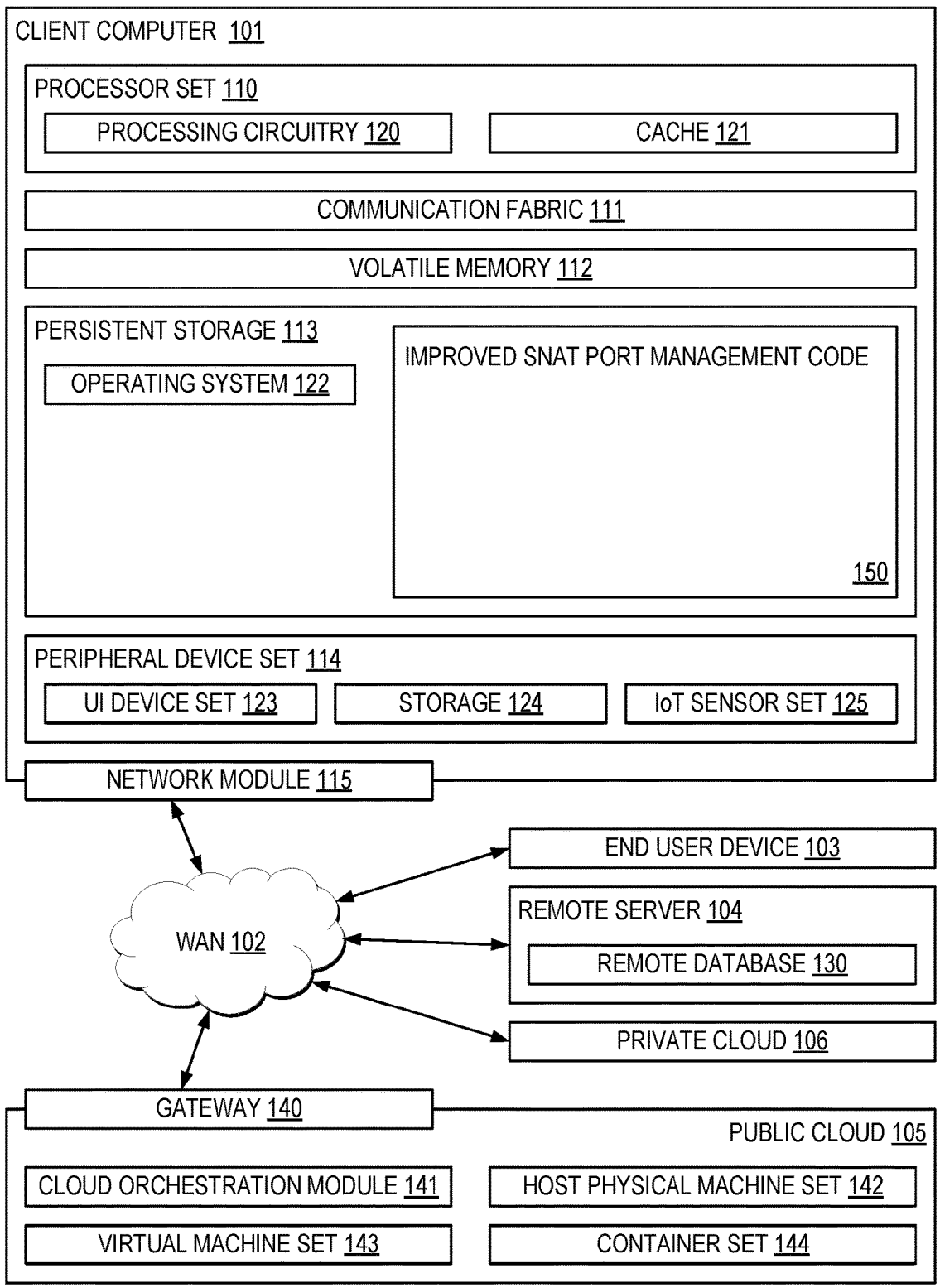
FIG. 1 is a diagram of a computing environment, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for maintaining a sufficient number of SNAT ports to satisfy DNS queries in real-time as they are received. This desirably reduces processing backlog as well as the number of received requests that fail. The improvement is achieved at least in part as a result of using each SNAT port to facilitate multiple connections to a same destination Internet protocol (IP) address and DNS port, e.g., as will be described in further detail below.

In one general approach, a computer-implemented method includes: determining whether a destination for a DNS query corresponds to an existing SNAT port in response to receiving the DNS query. Implementations herein configure SNAT ports to facilitate multiple connections to a same destination IP address and DNS port. In other words, each SNAT port may be used to connect a plurality of different DNS queries to a same destination IP address and DNS port. This desirably allows for significantly more DNS queries to be processed simultaneously and in parallel. This may be achieved at least in part as a result of implementing DNS characteristics in a SNAT connection table used to manage the source and destination information corresponding to a DNS query.

The computer-implemented method also includes, modifying the DNS query to incorporate an existing SNAT port in response to determining that the destination for the DNS query corresponds to the existing SNAT port. A map entry corresponding to the existing SNAT port is also updated to reflect this modification. Again, SNAT ports may be used to connect a plurality of different DNS queries to a same destination IP address and DNS port. This allows for a single SNAT port to process each of the queries (and corresponding responses) received that correspond to a same destination IP address and port. Performance (e.g., throughput) of the overarching system is thereby significantly improved by avoiding bottlenecks and increasing the number of operations that may be satisfied (e.g., performed) at the same time, which has been conventionally unachievable.

The computer-implemented method further includes satisfying the modified DNS query. Processing multiple queries in parallel by modifying queries directed to a same IP address and DNS port to be performed in parallel using a same SNAT port. This helps maintain a sufficient number of SNAT ports that are capable of satisfying DNS queries in real-time as they are received. This avoids SNAT port exhaustion, and reduces processing backlog as well as the number of received requests that fail. Additionally, control plane communication is reduced, thereby improving datapath performance.

In some implementations, a determination is made as to whether the destination for a DNS query corresponds to an existing SNAT port. Moreover, this determination may be made in response to receiving the DNS query. Again, SNAT ports herein are able to facilitate multiple connections to a same destination IP address and DNS port. In other words, each SNAT port may be used to connect a plurality of different DNS queries to a same destination IP address and DNS port. This desirably allows for significantly more DNS queries to be processed simultaneously and in parallel.

In response to determining that the destination for the DNS query corresponds to an existing SNAT port, the DNS query is modified to incorporate the existing SNAT port, and a map entry corresponding to the existing SNAT port is also updated. SNAT ports having characteristics that match incoming queries are preferably identified and modified to satisfy the incoming queries. Again, SNAT ports may be used to connect a plurality of different DNS queries to a same destination IP address and DNS port. This allows for a single SNAT port to process each of the queries (and corresponding responses) received that correspond to a same destination IP address and port. Performance (e.g., throughput) of the overarching system is thereby significantly improved by avoiding bottlenecks and increasing the number of operations that may be satisfied (e.g., performed) at the same time, which has been conventionally unachievable.

Moreover, the modified DNS query is satisfied. As noted above, processing multiple queries in parallel by modifying queries directed to a same IP address and DNS port to be performed in parallel using a same SNAT port. This helps maintain a sufficient number of SNAT ports that are capable of satisfying DNS queries in real-time as they are received. This avoids SNAT port exhaustion, and reduces processing backlog as well as the number of received requests that fail.

In some implementations, modifying the DNS query to incorporate the existing SNAT port includes referencing (i) an IP address, and (ii) a destination port, that correspond to the existing SNAT port. This desirably ensures that each of the DNS queries are correlated with an IP address and destination port such that at least some of the DNS queries can be properly satisfied in parallel with queries having a same IP address and/or destination port.

In some implementations, it may be determined that the destination for a DNS query does not correspond to an existing SNAT port. In such situations, a new SNAT port is allocated. While it is desirable that multiple DNS queries are performed in parallel, this may not be achieved for queries that do not share a common IP address and destination. New SNAT ports may thereby be allocated to satisfy queries that do not match existing queries, to ensure proper performance.

A new map entry is also created, which includes a source IP address and a source port of the new SNAT port. By indicating the IP address and port for the newly created SNAT port, queries received in the future may be compared against the newly created SNAT port, and determine situations where future queries should be added to the same SNAT port.

The DNS query may further be modified to reference the source IP address and the source port of the new SNAT port. This includes modifying the DNS query to indicate the new SNAT port. This desirably ensures that the newly created SNAT port is actually used to process the DNS query as intended. Updating the query to reference the new SNAT port thereby prevents data errors and improves throughput of the system.

In some implementations, a source of the DNS reply is used to identify a corresponding DNS query destination. Information corresponding to the DNS reply is used to identify a DNS query that caused the given DNS reply to be produced. In some approaches, this may be achieved by comparing an ID assigned to the reply, to a SNAT connection table. The SNAT connection table may thereby be used to identify an original DNS query that corresponds to the present DNS reply received. In other words, the received DNS reply is correlated with the DNS query that caused the received DNS reply to be received.

The DNS reply is also modified to reference (i) an IP address, and (ii) a destination port, that correspond to a virtual server associated with the identified DNS query destination. The DNS reply is thereby modified to ensure it is directed to an IP address and destination port that initially processed the DNS query that initiated the DNS reply now being processed. Accordingly, the modified DNS reply is sent to the virtual server using the added IP address and destination port to ensure the original DNS query is satisfied.

In some implementations, the virtual server is implemented at an edge node of a distributed system. This desirably ensures that each of the queries that are received at and processed by a virtual server at an edge node are processed more efficiently than has been conventionally achievable. In other words, the edge node may be able to process multiple queries in parallel, thereby improving throughput, e.g., as described herein.

In some implementations, a determination is made as to whether any unsatisfied DNS queries also correspond to the existing SNAT port. This determination may be performed in response to the DNS query being satisfied. This desirably ensures that each of the received DNS queries are properly satisfied before releasing a SNAT port as available to satisfy additional incoming queries. However, in response to determining that no unsatisfied DNS queries correspond to the existing SNAT port, the existing SNAT port is released. Again, this ensures that each of the received queries pertaining to (e.g., assigned to) an existing SNAT port are satisfied before releasing that SNAT port to be used differently. This reduces errors experienced while satisfying incoming queries.

In some implementations, the process of causing the modified DNS query to be satisfied includes sending the modified DNS query to a virtual server. Sending the modified DNS query to the virtual server desirably expands throughput of the system as a whole. The virtual server provides additional processing capabilities which may be used to supplement other components. For instance, the virtual server may be configured to communicate with a central server that may be orchestrating performance of the query as a whole. Again, this expands throughput of the system and reduces wait times.

While it is preferred that SNAT ports satisfy the DNS queries that are assigned thereto, situations may arise in which one or more queries cannot be satisfied. For instance, the query may not be achievable, may result in a program getting stuck in a repeating loop, instructions may be corrupted, etc. Thus, in response to determining that a predetermined amount of time has passed since the DNS query was sent to the virtual server without receiving a response, the existing SNAT port may be released. This further ensures a sufficient number of available SNAT ports are maintained to process incoming queries.

In another general approach, a computer program product includes a computer readable storage medium having program instructions embodied therewith. The program instructions are readable by a processor, executable by the processor, or readable and executable by the processor, to cause the processor to: perform the foregoing method.

In yet another general approach, a system includes: a processor, as well as logic that is integrated with the processor, executable by the processor, or integrated with and executable by the processor. Moreover, the logic is configured to: perform the foregoing method.

Various aspects of the present disclosure are described by narrative text, flowcharts, block diagrams of computer systems and/or block diagrams of the machine logic included in computer program product (CPP) approaches. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product approaches ("CPP approach" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as improved SNAT port management code at block 150 for maintaining a sufficient number of SNAT ports to satisfy DNS queries in real-time as they are received. The improvement is achieved at least in part as a result of using each SNAT port to facilitate multiple connections to a same destination IP address and DNS port. This desirably reduces processing backlog as well as the number of received requests that fail.

In addition to block 150, computing environment 100 includes, for example, computer 101, wide area network (WAN) 102, end user device (EUD) 103, remote server 104, public cloud 105, and private cloud 106. In this approach, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various approaches, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some approaches, storage 124 may take the form of a quantum computing storage device for storing data in the form of qubits. In approaches where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some approaches, network control functions and network forwarding functions of network module 115 are performed on the same physical hardware device. In other approaches (for example, approaches that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some approaches, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some approaches, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other approaches a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this approach, public cloud 105 and private cloud 106 are both part of a larger hybrid cloud.

In some aspects, a system according to various approaches may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various implementations.

As previously mentioned, computing power has continued to advance and the use of IoT devices has become more prevalent, thereby causing a continued increase to an amount of data produced. For instance, the rise of smart enterprise endpoints has led to large amounts of data being generated at remote locations. Data production will only further increase with the growth of 5G networks and an increased number of connected mobile devices. This issue has also become more prevalent as the complexity of machine learning models increases. Increasingly complex machine learning models translate to more intense workloads and increased strain associated with applying the models to received data.

Cloud computing has been implemented in an effort to improve the ability to process this increasing amount of data. For instance, cloud computing includes both public and private connections. A public connection makes computing resources (e.g., software applications, virtual machines, infrastructures, development platforms, etc.) available to users over a public connection to a network. Public cloud architectures are thereby multi-tenant environments in which users share a pool of virtual resources. Workloads originating from multiple different users might thereby be running on a shared physical server at the same time.

In contrast, a virtual private cloud (VPC) is a type of public cloud offering that allows for a private cloud-like computing environment to be established on shared public cloud infrastructure. A VPC thereby provides users the ability to define and control a virtual network that is logically isolated from all other public cloud tenants, thereby creating a private and secure place on the public cloud.

In a VPC, resources from a public cloud may thereby be deployed to create an isolated virtual network. For instance, these public cloud resources (also known as "logical instances") that can be used to form a VPC include compute resources, storage resources, and networking resources. According to an example, compute resources include virtual server instances (VSIs) or "virtual servers" that are presented to a user as virtual CPUs (vCPUs) with a desired amount of computing power, memory, etc. A VPC may thereby be configured to provide a user access to a virtual compute environment capable of operating as desired.

The process of deploying (e.g., configuring) a VPC for a particular implementation involves configuring a region and/or zone. For example, a region may serve as an abstraction that is related to the geographic area in which the VPC is being deployed. Each region may thereby include multiple different zones, each of which represents independent fault domains. Moreover, a VPC can be configured to span multiple zones in an assigned region. However, a zone may serve as an abstraction that refers to the physical data center that hosts the compute, network, and storage resources, as well as the related cooling and power.

External connectivity to a VPC may be achieved by using a public gateway that is attached to a subnet, or a floating IP address that is attached to a virtual server instance. For example, a public gateway may be used in combination with a SNAT, while a floating IP may be used for destination network address translation (DNAT). As noted above, a public gateway enables a subnet and attached virtual server instances to connect to a network. Moreover, while some subnets are private by default, each instance in a subnet can connect to a network in response to being attached to a public gateway.

Although each zone typically only includes one public gateway, the public gateway can be attached to multiple subnets. Public gateways use Many-to-1 NAT which allows for thousands of instances with private addresses to use one public IP address with different port number to communicate with the public Internet. To maintain unique NAT sessions, the source ports used are also replaced. It follows that a significant number of ports are used to establish and maintain VPCs.

However, conventional products have suffered from significant performance issues in situations where ports are unavailable during use. In other words, conventional products have been unable to maintain a sufficient number of available ports to facilitate requests as they are received and processed. This has caused conventional products to experience significant performance backlog, failed requests, data loss, increased compute overhead, etc. While some attempts have been made to overcome these conventional shortcomings, they have proven to be unsuccessful.

In sharp contrast, implementations herein are desirably able to maintain a sufficient number of SNAT ports to satisfy DNS queries in real-time as they are received. This desirably reduces processing backlog as well as the number of received requests that fail. The improvement is achieved at least in part as a result of using each SNAT port to facilitate multiple connections to a same destination IP address and DNS port, e.g., as will be described in further detail below.

Figure 2A:
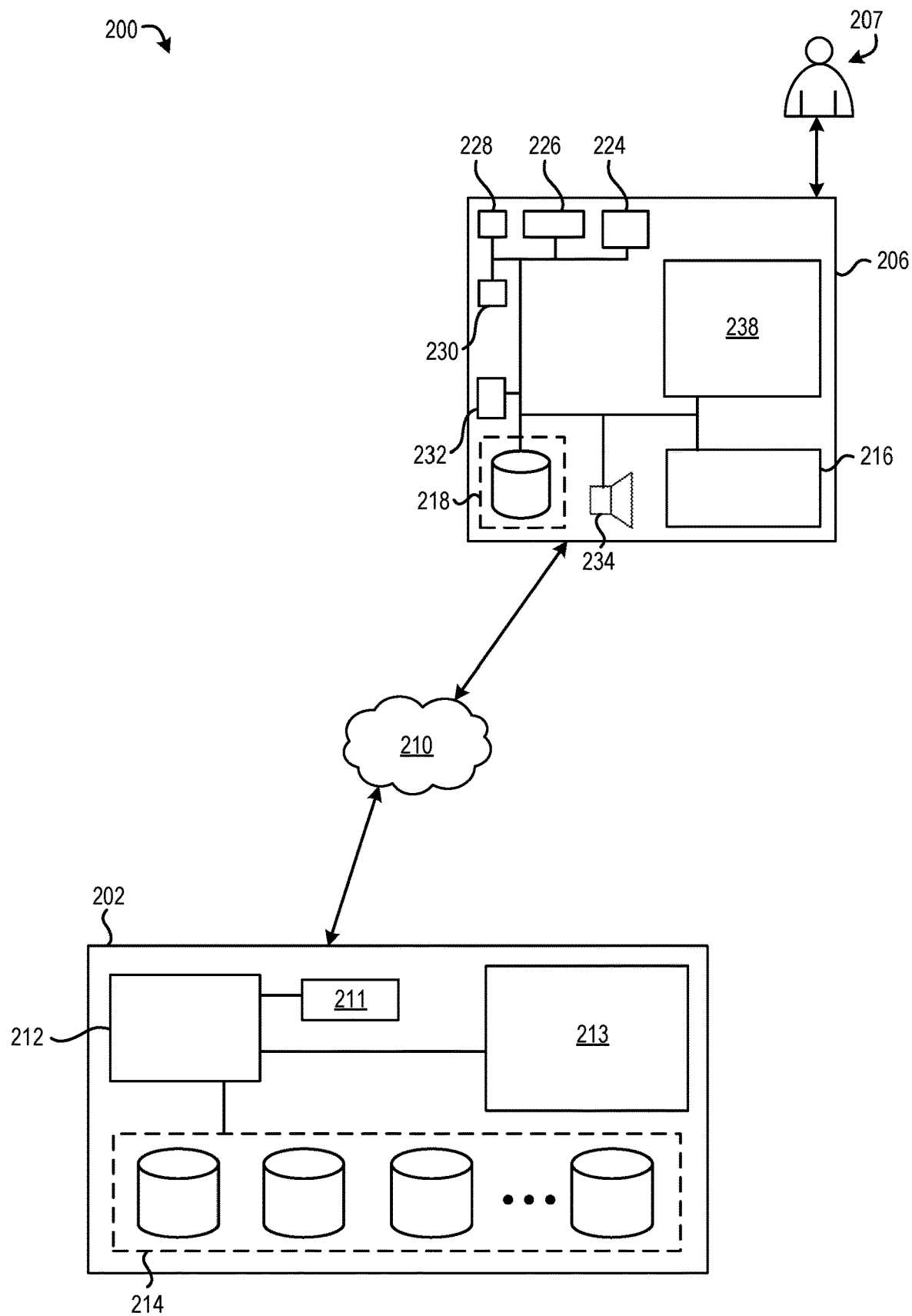
FIG. 2A is a partial representational view of a distributed system, in accordance with one approach.

Looking now to FIG. 2A, a system 200 having a distributed architecture is illustrated in accordance with one approach. As an option, the present system 200 may be implemented in conjunction with features from any other approach listed herein, such as those described with reference to the other FIGS., such as FIG. 1. However, such system 200 and others presented herein may be used in various applications and/or in permutations which may or may not be specifically described in the illustrative approaches or implementations listed herein. Further, the system 200 presented herein may be used in any desired environment. Thus FIG. 2A (and the other FIGS.) may be deemed to include any possible permutation.

As shown, the system 200 includes a central server 202 that is connected to an electronic device 206 accessible to the user 207. The electronic device 206 and central server 202 may thereby be separated from each other such that they are positioned in different geographical locations. For instance, the central server 202 and electronic device 206 are connected to a network 210.

The network 210 may be of any type, e.g., depending on the desired approach. For instance, in some approaches the network 210 is a WAN, e.g., such as the Internet. However, an illustrative list of other network types which network 210 may implement includes, but is not limited to, a LAN, a PSTN, a SAN, an internal telephone network, etc. As a result, any desired information, data, commands, instructions, responses, requests, etc. may be sent between user 207 and central server 202 using the electronic device 206, regardless of the amount of separation which exists therebetween, e.g., despite being positioned at different geographical locations.

However, it should be noted that two or more of the electronic device 206 and/or central server 202 may be connected differently depending on the approach. According to an example, which is in no way intended to limit the invention, edge compute nodes may be located relatively close to each other and connected by a wired connection, e.g., a cable, a fiber-optic link, a wire, etc.; etc., or any other type of connection which would be apparent to one skilled in the art after reading the present description. The term "user" is in no way intended to be limiting either. For instance, while users are described as being individuals in various implementations herein, a user may be an application, an organization, an information technology (IT) department, a preset process, etc. The use of "data" and "information" herein is in no way intended to be limiting either, and may include any desired type of details, e.g., depending on the type of software (e.g., program) being evaluated.

With continued reference to FIG. 2A, the electronic device 206 and central server 202 are shown as having different configurations. For example, the central server 202 includes a large (e.g., robust) processor 212 coupled to a cache 211, a machine learning module 213, as well as a data storage array 214 having a relatively high storage capacity. The machine learning module 213 may include any desired number and/or type of machine learning models. For instance, the machine learning module 213 may include machine learning models that have been trained to manage the correlations between SNAT ports and IP/port pairs for a number of different DNS queries and responses.

Accordingly, in some approaches the machine learning module 213 may be used to evaluate DNS queries and responses downloaded over network 210, received from electronic device 206, loaded from data storage array 214, etc. The machine learning module 213 at a central server 202 may thereby be used in some implementations to process DNS queries and/or responses, by performing one or more of the operations in method 300, e.g., as will be described in further detail below.

With continued reference to FIG. 2A, electronic device 206 includes a processor 216 coupled to memory 218. The processor 216 is also connected to a display screen 224, a computer keyboard 226, a computer mouse 228, a microphone 230, a camera 232, and an audio speaker 234. Accordingly, the processor 216 may receive inputs (e.g., DNS queries) from user 207 using one or more of: the display screen 224 (e.g., using keys of a virtual computer keyboard, a touch screen, etc.), the computer keyboard 226, the computer mouse 228, the microphone 230, and/or the camera 232. The processor 216 may thereby be configured to receive inputs (e.g., text, sounds, images, motion data, etc.) from any of the components in electronic device 206, as entered by the user 207. These inputs typically correspond to information presented on the display screen 224 while the entries were received. Moreover, the inputs received may impact the information shown on display screen 224, data stored in memory 218, information collected from the microphone 230 and/or camera 232, status of an operating system being implemented by processor 216, etc.

Electronic device 206 also includes a machine learning module 238 which may be used to evaluate DNS queries and responses downloaded over network 210, received from electronic device 206, loaded from data storage array 214, etc. The machine learning module 213 at a central server 202 may thereby be used in some implementations to process DNS queries and/or responses, by performing one or more of the operations in method 300 below, e.g., as will soon become apparent.

Figure 2B:
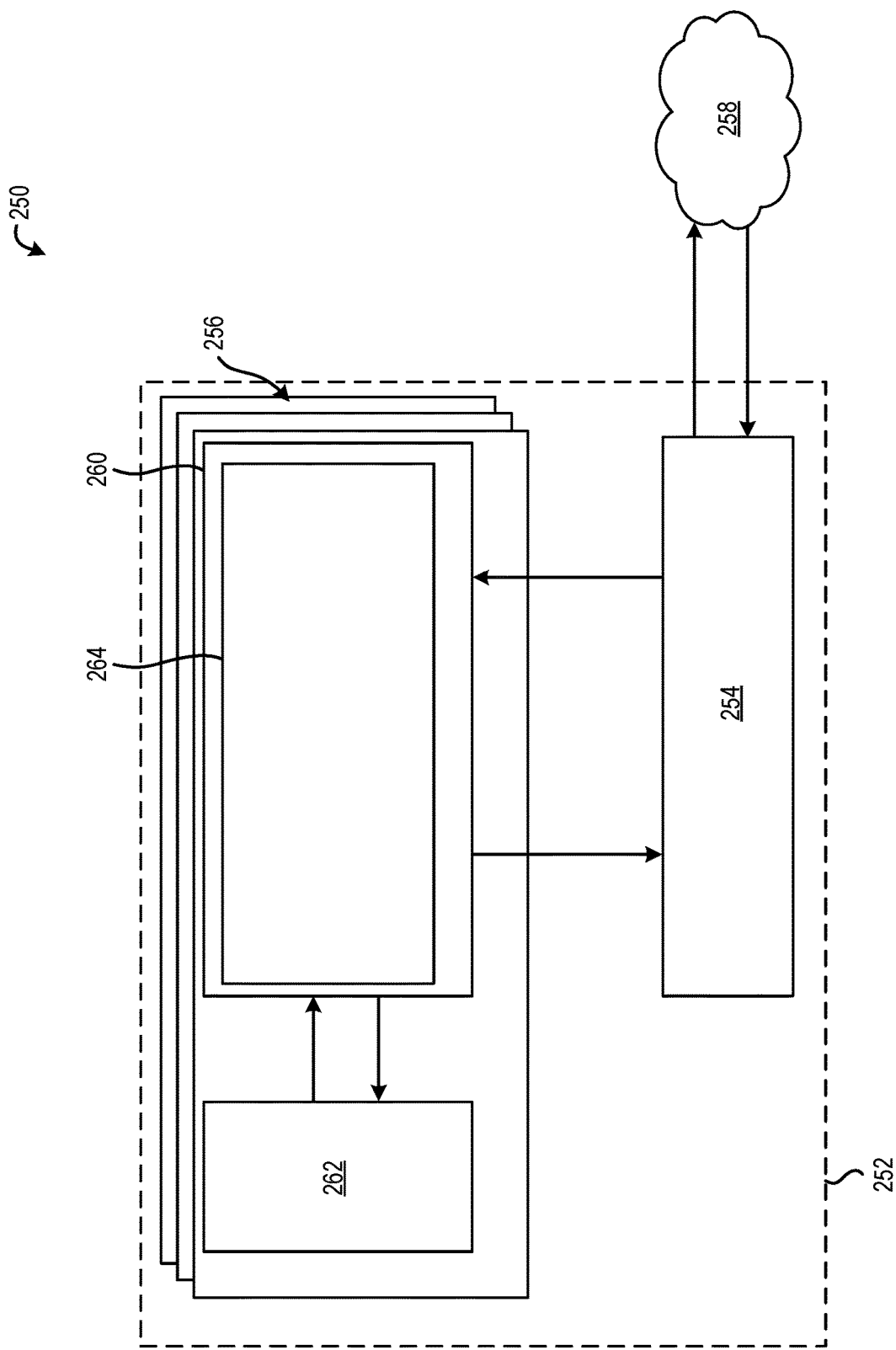
FIG. 2B is a representational view of a system architecture, in accordance with one approach.

Looking now to FIG. 2B, a system architecture 250 is illustrated in accordance with one approach. As an option, the present system architecture 250 may be implemented in conjunction with features from any other approach listed herein, such as those described with reference to the other FIGS., such as FIGS. 1-2A. However, such system architecture 250 and others presented herein may be used in various applications and/or in permutations which may or may not be specifically described in the illustrative approaches or implementations listed herein. Further, the system architecture 250 presented herein may be used in any desired environment. Thus FIG. 2B (and the other FIGS.) may be deemed to include any possible permutation.

As shown, the system architecture 250 includes a VPC 252. Again, VPCs are formed using resources from a public connection (e.g., network 258) to create an isolated network which serves as the VPC 252. This allows edge node 254 and compute node 256 to communicate in private over the VPC 252. In other words, information may be exchanged between the edge and compute nodes 254, 256 in private as opposed to over an open (e.g., public) network 258.

The compute node 256 is shown as including a number of potential layers. Accordingly, the compute node 256 may include a number of components, possibly spread across more than one location, include more than one processing layer (e.g., for performing operations simultaneously and in parallel), etc. The compute node 256 layer shown includes a SDN module 260 in communication with a VSI 262. According to an example, the VSI 262 includes a virtual server interface that is made available (e.g., presented) to users as virtual CPUs with a desired amount of computing power, memory, etc. The VSI 262 may thereby be configured to provide a user access to a virtual compute environment managed by compute node 256, and capable of operating as desired.

The SDN module 260 further includes a SNAT port management module 264 configured to manage each of the active SNAT ports connecting various sources to corresponding destinations. For example, backend instances like virtual machines or compute instances may be configured to have outbound connectivity to the Internet. Accordingly, a public load balancer can be used to provide outbound connectivity to the Internet for the backend instances by using SNAT to translate the private IP addresses of the backend instances into a public IP address of the load balancer. For instance, SNAT may be able to map the private IP address of the backend instances to the public IP address of the load balancer, thereby preventing outside sources from having a direct address to the backend instances.

Figure 2C:
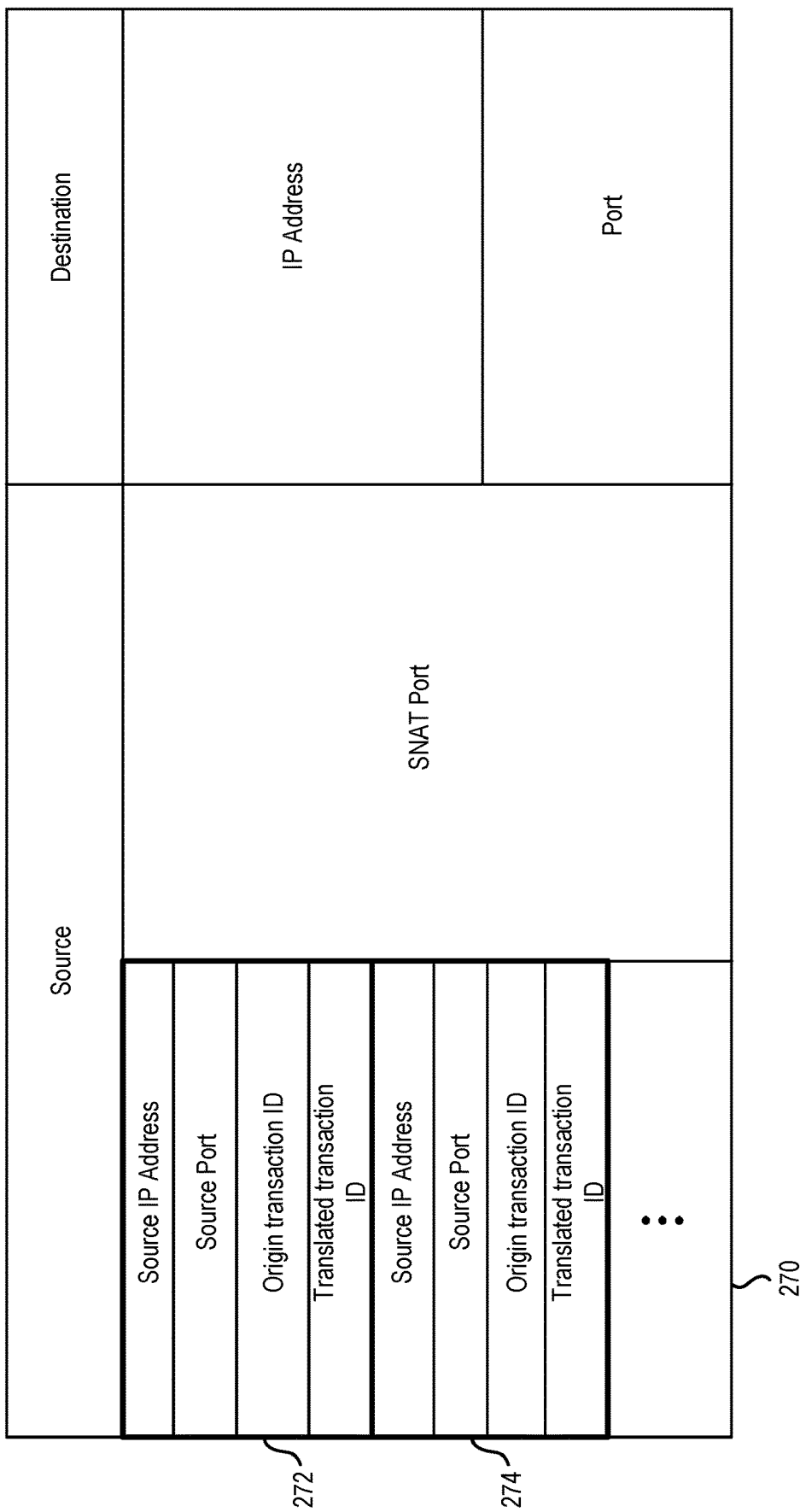
FIG. 2C is an illustrative SNAT connection table, in accordance with one approach.

In some implementations, the SNAT port management module 264 includes a table that indicates the IP addresses and ports that define the source (e.g., origin) and destination (e.g., target) locations associated with a number of requests. Referring momentarily now to FIG. 2C, an illustrative SNAT connection table 270 is shown in accordance with one approach, which is in no way intended to limit the invention. It follows that SNAT connection table 270 in FIG. 3C may be implemented in the SNAT port management module 264 of FIG. 3B in some approaches. However, it should again be noted that the details shown in FIG. 3C are illustrated in accordance with one implementation which is in no way intended to limit the invention.

As shown, the SNAT connection table 270 includes a Source column and a Destination column. The Source column includes information corresponding to a source of a query or response that is received. Specifically, the Source column is shown as including the Source IP Address, Source Port, Origin transaction ID, and Translated transaction ID for each query that is received. Different sets of these values have been organized into groups corresponding to the different SDN queries 272, 274, etc., that have been received and which are currently being processed. The SNAT connection table 270 may include additional information in some approaches. For instance, the SNAT connection table 270 may include an original 5 IP-tuples corresponding to a source, as well as a translated 5 IP-tuples corresponding to a destination, along with the original transaction ID and translated transaction ID, e.g., as would be appreciated by one skilled in the art after reading the present description.

As shown, each of the different SDN queries 272, 274 have been assigned to a same SNAT port. This shared SNAT port is thereby able to facilitate (e.g., process) each of the SDN queries received which correspond to a common destination IP Address and destination Port as shown in the SNAT connection table 270. Again, this significantly reduces the number of SNAT ports that are utilized to satisfy various DNS queries in real-time as they are received. In turn, this also reduces processing backlog as well as the number of received requests that fail. Once again, this improvement is achieved at least in part as a result of using each SNAT port to facilitate multiple connections to a same destination IP address and DNS port, e.g., as shown in FIG. 2C.

Returning now to FIG. 2B, it follows that the SDN module 260 may thereby be used to evaluate DNS queries and responses received from a user (not shown), received from edge node 254, originally downloaded over network 258, etc. The SDN module 260 of compute node 256 may thereby be used in some implementations to process DNS queries and/or responses, by performing one or more of the operations in method 300, e.g., will soon become apparent.

Figure 3A:
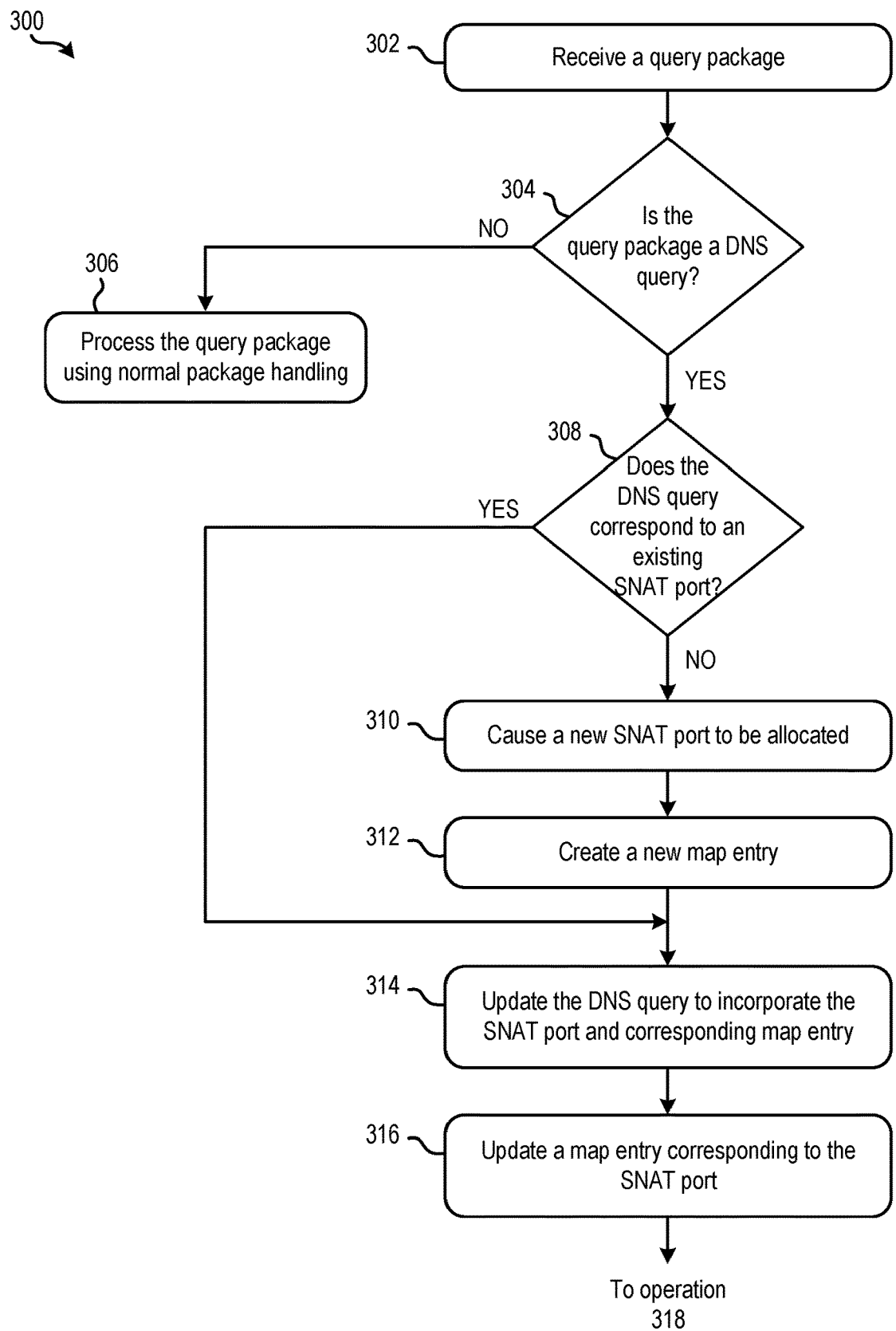
FIG. 3A is a flowchart of a method, in accordance with one approach.
Figure 3A:
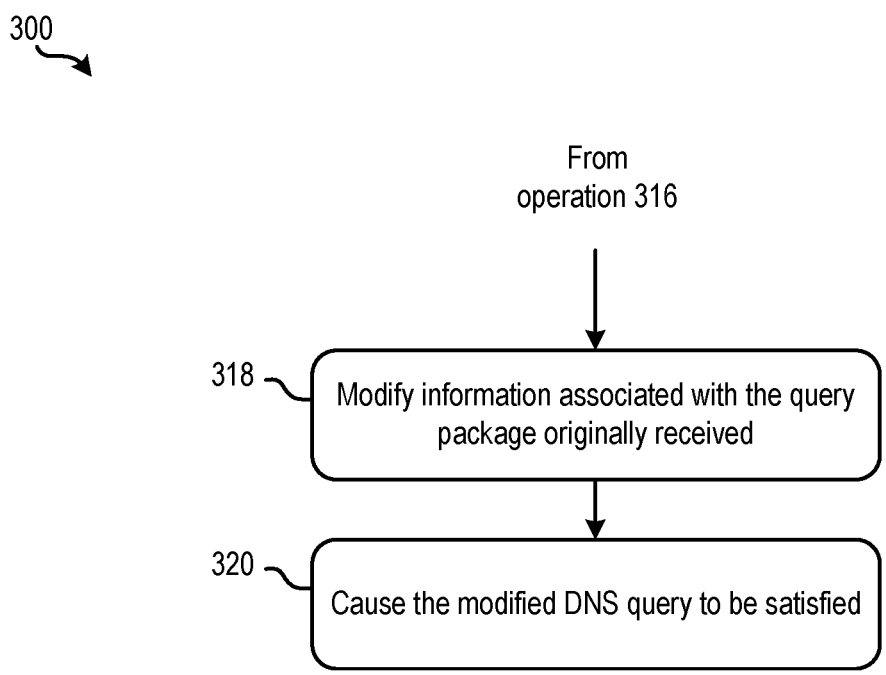

Now looking to FIG. 3A, a flowchart of a computer-implemented method 300 for processing DNS requests is shown according to one implementation. The method 300 may be performed in accordance with the present invention in any of the environments depicted in FIGS. 1-2B, among others, in various implementations. Of course, more or less operations than those specifically described in FIG. 3A may be included in method 300, as would be understood by one of skill in the art upon reading the present descriptions.

Each of the operations in method 300 may be performed by any suitable component of the operating environment using known techniques and/or techniques that would become readily apparent to one skilled in the art upon reading the present disclosure. For example, in some implementations one or more of the operations in method 300 may be performed by a SDN module (e.g., see SDN module 260 of FIG. 2B above). In various other implementations, the method 300 may be partially or entirely performed by a controller, a processor, etc., or some other device having one or more processors therein.

The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3A, operation 302 of method 300 includes receiving a query package, while operation 304 includes determining whether the query package is a DNS query. In response to determining that the package received does not include a DNS query, method 300 is shown as proceeding to operation 306. There, the received package is processed using a nominal package handling procedure. For example, queries that do not involve accessing a shared network may be processed locally using predetermined processes.

In response to reaching operation 306, method 300 may end. However, it should be noted that although method 300 may end upon reaching operation 306, any one or more of the processes included in method 300 may be repeated in order to process additional queries received. In other words, any one or more of the processes included in method 300 may be repeated for subsequently received query packets, e.g., as would be appreciated by one skilled in the art after reading the present description.

Returning to operation 304, method 300 proceeds to operation 308 in response to determining that the package received does include a DNS query. There, operation 308 includes determining whether a destination for the DNS query corresponds to an existing SNAT port.

As noted above, implementations herein configure SNAT ports to facilitate multiple connections to a same destination IP address and DNS port. In other words, each SNAT port may be used to connect a plurality of different DNS queries to a same destination IP address and DNS port. This desirably allows for significantly more DNS queries to be processed simultaneously and in parallel. This may be achieved at least in part as a result of implementing DNS characteristics in a SNAT connection table used to manage the source and destination information corresponding to a DNS query. For example, a SNAT port management module may maintain a SNAT connection table, e.g., as seen in FIGS. 2B-2C above.

Again, this allows for a single SNAT port to process each of the queries (and corresponding responses) received that correspond to a same destination IP address and port. This causes performance (e.g., throughput) of a system to significantly increase by avoiding bottlenecks and increasing the number of operations that may be satisfied (e.g., performed) at the same time, which has been conventionally unachievable.

It follows that operation 308 is able to determine whether a present DNS query includes a same destination IP address and port as an existing SNAT port. In situations where the DNS query does not correspond to an existing SNAT port, a new SNAT port may be created and used to process the DNS query. However, in situations that a DNS query does include the same destination IP address and port as an existing SNAT port, the existing SNAT port can be used to process the DNS query in addition to existing DNS queries involving a same destination, e.g., as will soon become apparent.

Method 300 thereby proceeds from operation 308 to operation 310 in response to determining that the destination for the DNS query does not correspond to an existing SNAT port. There, operation 310 includes causing a new SNAT port to be allocated.

The process of allocating the new SNAT port involves selecting a currently unused transaction ID to correlate with the received DNS query. The selected SNAT port may be configured according to a user datagram protocol (UDP), e.g., as would be appreciated by one skilled in the art after reading the present description.

In addition to allocating the new SNAT port, a new map entry is created. See operation 312. The new map entry is preferably created such that it includes (e.g., references) a source IP address and a source port of the new SNAT port. For instance, the new map entry may be added to a SNAT connection table (e.g., see table 270 of FIG. 2C). The new map entry may also indicate an original transaction ID of the DNS query that was received to retain this information after the transaction ID has been modified, e.g., as will soon become apparent.

In response to allocating a new SNAT port and corresponding map entry, the DNS query is preferably updated to indicate (e.g., reference) this new information. Accordingly, operation 314 includes updating the DNS query to incorporate the new SNAT port and corresponding map entry. For instance, the ID of the DNS query may be updated to reference the IP address and port that correspond to the newly allocated SNAT port.

However, it should be noted that method 300 is shown as also advancing from operation 308 directly to operation 314 in response to determining that the DNS query corresponds to an existing SNAT port. Accordingly, operation 314 includes updating some DNS queries to incorporate an existing SNAT port and corresponding map entry. In some approaches, a destination IP address and destination port indicated in the received DNS query may be updated to include IP address and destination port information that corresponds to the existing SNAT port. In other words, the DNS query is integrated into the existing SNAT port and satisfied in parallel to a number of other DNS queries that correspond to a same IP address and port, e.g., as described above.

The process of updating the DNS query to incorporate the new SNAT port and corresponding map entry involves translating the source IP address, source port, and transaction ID of the DNS query. The source IP address is translated to the existing SNAT IP address, the source port is translated to the existing SNAT port, and the transaction ID is updated to include a transaction ID corresponding to the existing SNAT port. These translations are preferably recorded in memory (e.g., in a lookup table) such that the original information (e.g., transaction IDs) is retained. This information may thereby be used to match responses received with the originating query to reduce response times. Accordingly, a DNS reply packet received may be matched with a corresponding DNS query by updating the destination IP, destination port, and transaction ID of the DNS reply packet such that it is translated back to satisfy the originating query.

For example, the destination IP, destination port, transaction ID, and other information may be indicated in the header of each DNS packet. Referring momentarily to FIG. 4, a DNS packet header 400 is illustrated in accordance with one implementation. As an option, the present DNS packet header 400 may be implemented in conjunction with features from any other implementation listed herein, such as those described with reference to the other FIGS., such as FIGS. 2A-3B.

As shown, the DNS packet header 400 includes a number of fields, each of which may be used to store information describing the corresponding DNS query or DNS reply. For instance, the DNS transaction ID 402 is shown as a 16-bit identifier. This 16-bit identifier may be assigned by a program generating a query in some implementations. Accordingly, this transaction ID 402 may be copied to a corresponding reply to connect the two. The transaction ID 402 may thereby be used by a requester to match DNS replies to corresponding ones of the outstanding (or "uncompleted") queries. Maintaining DNS transaction IDs may thereby also improve DNS traffic management while performing NAT.

Returning now to FIG. 3A, it follows that operation 314 includes re-generating the DNS query using a source IP address and source port of a new or existing SNAT port. In other words, the DNS query that was originally received is modified to reference the source IP address and the source port of the new SNAT port or the existing SNAT port. This desirably allows for DNS ID conflicts to be avoided among different VSIs. The original transaction ID of the DNS query received is also preferably maintained, thereby allowing for received responses to be directed to their corresponding queries, e.g., as described above.

From operation 314, method 300 proceeds to operation 316, which includes updating a map entry corresponding to the SNAT port. In other words, operation 316 includes updating a map entry with information associated with the translation that occurred. For example, the map entry may be updated to include the source IP address, source port, the original transaction ID, the translated transaction ID, and any other desired information. Moreover, this information may be stored in a table (e.g., see SNAT connection table 270 of FIG. 2C) such that it may be used to process received DNS responses more efficiently than would otherwise be achievable.

Similarly, operation 318 includes modifying information associated with the query package originally received in operation 302. The query package is preferably updated to incorporate (e.g., reference) the SNAT port being used to facilitate the given query. For instance, a source IP address of the package may be changed to the IP address corresponding to the SNAT port. The source port of the package may also be updated to reference the SNAT port, transaction ID, translated transaction ID, etc., as desired to ensure the query package is satisfied appropriately.

Furthermore, operation 320 includes causing the modified DNS query to be satisfied. In other words, the modified DNS is implemented such that the query is satisfied using resources that correspond to the SNAT port assigned to the query. As noted above, allowing for multiple queries to be processed by the same SNAT port by sharing a common IP and port allows for throughput to be significantly improved.

According to an example, which is in no way intended to limit the invention, the modified DNS query may be sent to a virtual server to be satisfied (e.g., performed). Accordingly, the DNS query may have been modified to indicate the IP address, port, etc., of a virtual server designated to process the modified DNS query sent in operation 320.

While the DNS query is sent to a virtual server for processing, method 300 may also monitor whether a response satisfying the DNS query has been received. For example, a module may be configured to inspect DNS replies received and keep track of how much time has passed since each DNS query was originally sent. By comparing these amounts of time to a predetermined threshold or range, implementations herein are able to identify failed queries and proceed accordingly without consuming additional resources unnecessarily. Similarly, a number of query failures, satisfied queries, user inputs, etc. may be used to quantify how long a DNS query has been processed. In response to determining that a predetermined amount of time has passed since the DNS query was sent to the virtual server without receiving a response, the DNS query may be failed. Moreover, the corresponding SNAT port may be released in situations where the SNAT port does not include any other DNS queries.

In response to reaching operation 320, method 300 may end. However, it should be noted that although method 300 may end upon reaching operation 320, any one or more of the processes included in method 300 may be repeated in order to process additional queries received. In other words, any one or more of the processes included in method 300 may be repeated for subsequently received query packets, e.g., as would be appreciated by one skilled in the art after reading the present description.

Additionally, responses may be received in response to the DNS queries sent in method 300. For instance, method 350 in FIG. 3B includes a method for processing a DNS response received in accordance with one implementation. The method 350 may be performed in accordance with the present invention in any of the environments depicted in FIGS. 1-2B, among others, in various implementations. Of course, more or less operations than those specifically described in FIG. 3B may be included in method 350, as would be understood by one of skill in the art upon reading the present descriptions.

Each of the operations in method 350 may be performed by any suitable component of the operating environment using known techniques and/or techniques that would become readily apparent to one skilled in the art upon reading the present disclosure. For example, in some implementations one or more of the operations in method 350 may be performed by a SDN module (e.g., see SDN module 260 of FIG. 2B above). In various other implementations, the method 350 may be partially or entirely performed by a controller, a processor, etc., or some other device having one or more processors therein.

The processor, e.g., processing circuit(s), chip(s), and/or module(s) implemented in hardware and/or software, and preferably having at least one hardware component may be utilized in any device to perform one or more steps of the method 350. Illustrative processors include, but are not limited to, a central processing unit (CPU), an application specific integrated circuit (ASIC), a field programmable gate array (FPGA), etc., combinations thereof, or any other suitable computing device known in the art.

Figure 3B:
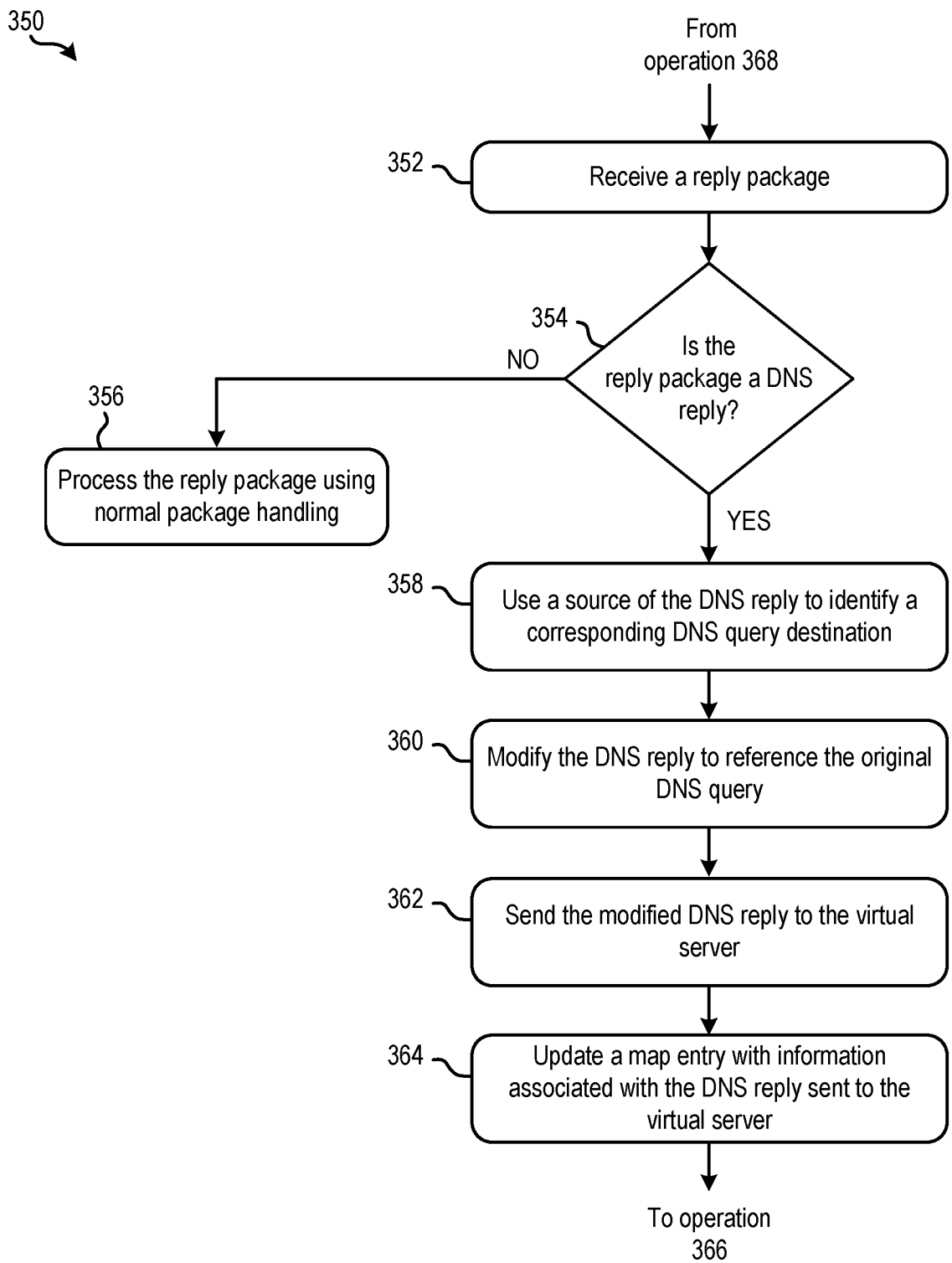
FIG. 3B is a flowchart of a method, in accordance with one approach.
Figure 3B:
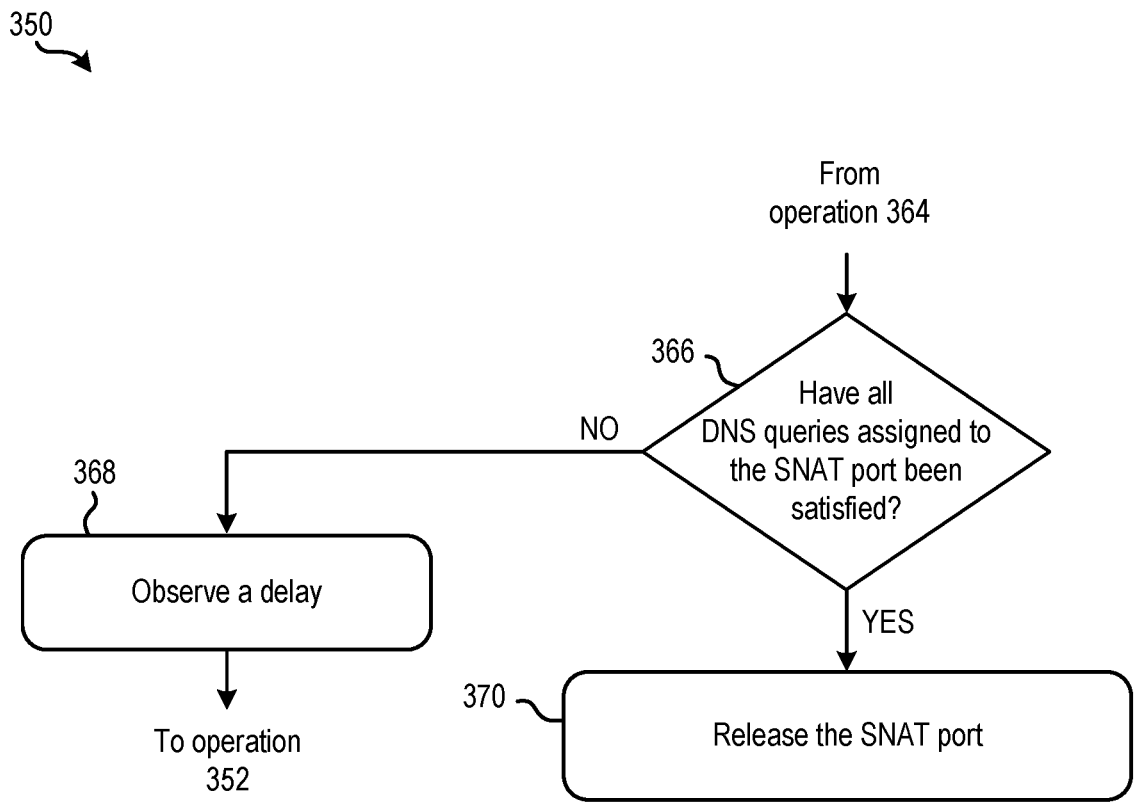
Figure 4:
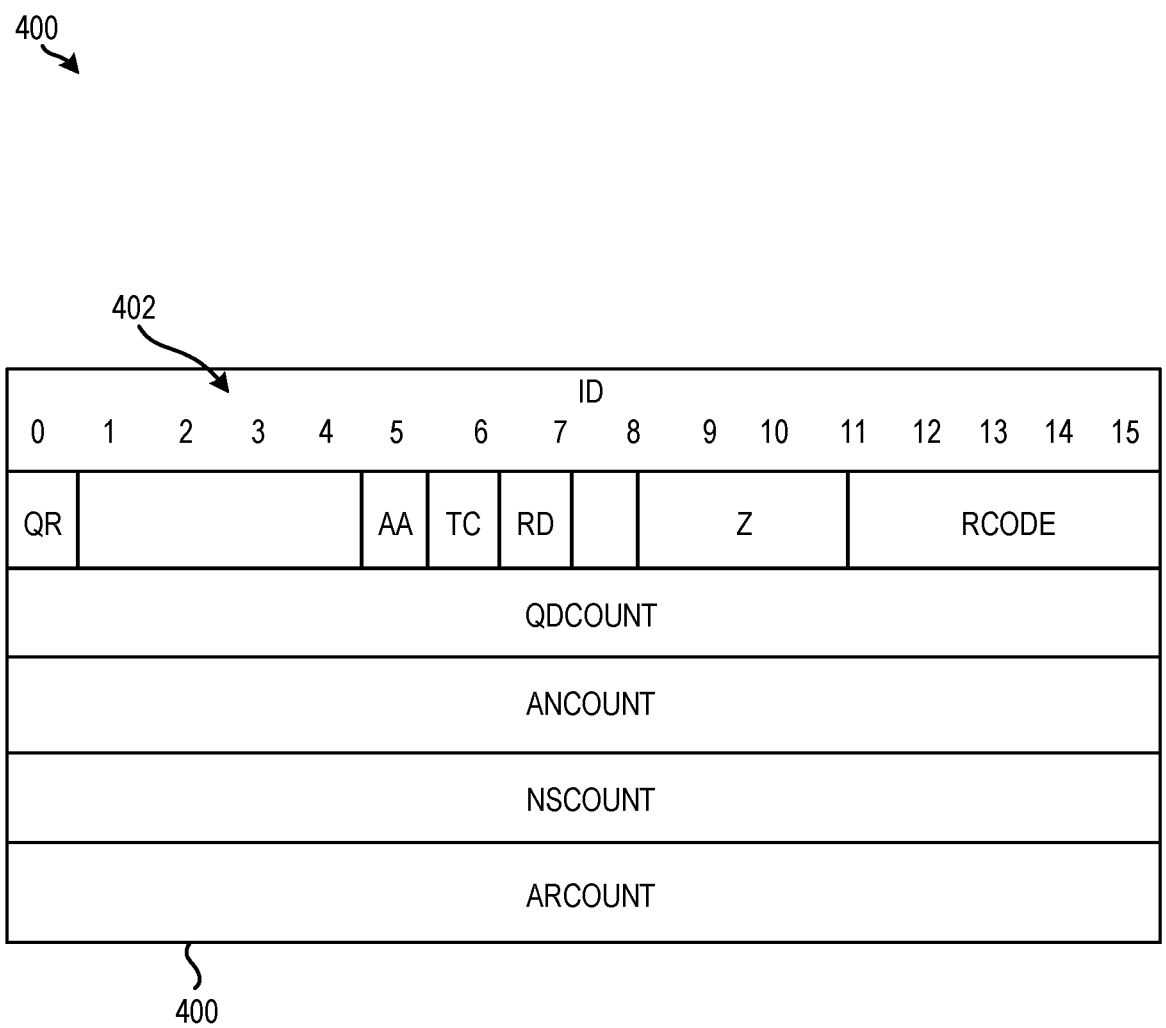
FIG. 4 is a representational view of a DNS packet header, in accordance with one approach.

As shown in FIG. 3B, operation 352 includes receiving a reply package, while operation 354 includes determining whether the reply package is a DNS reply. In other words, operation 354 includes determining whether the received reply package corresponds to an original DNS query. In response to determining that the package received does not include a DNS reply, method 350 is shown as proceeding to operation 356. There, the received reply package is processed using a nominal package handling procedure. For example, replies that do not involve accessing a shared network may be processed locally using predetermined processes.

In response to reaching operation 356, method 350 may end. However, it should be noted that although method 350 may end upon reaching operation 356, any one or more of the processes included in method 350 may be repeated in order to process additional replies received. In other words, any one or more of the processes included in method 350 may be repeated for subsequently received reply packets, e.g., as would be appreciated by one skilled in the art after reading the present description.

Returning to operation 354, method 350 proceeds to operation 358 in response to determining that the package received does include a DNS reply. There, operation 358 includes using a source of the DNS reply to identify a corresponding DNS query destination. In other words, operation 358 uses information corresponding to the DNS reply to identify a DNS query that caused the given DNS reply to be produced. In some approaches, this may be achieved by comparing an ID assigned to the reply, to a SNAT connection table. The SNAT connection table may thereby be used to identify an original DNS query that corresponds to the present DNS reply received. In other words, operation 358 correlates the received DNS reply with the DNS query that caused the received DNS reply to be received.

In response to identifying a DNS query that corresponds to the received DNS reply, the DNS reply is preferably updated such that it correlates with the original DNS query, e.g., such that it may be satisfied. Accordingly, operation 360 further includes modifying the DNS reply to reference the original DNS query. In preferred approaches, the DNS reply is modified to reference an IP address and a port which correspond to the original DNS query.

According to an example, the DNS reply may be updated to reference an IP address and port which correspond to a virtual server associated with the original DNS query and/or the reply. In other words, the DNS reply may be modified to indicate the IP address, port, etc., of a virtual server that processed the DNS query originally sent (e.g., see operation 320 of FIG. 3A) and/or which produced the reply received in operation 352. However, a DNS reply may be modified to include any desired information, e.g., such as the original transaction ID of the DNS query received.

From operation 360, method 350 proceeds to operation 362 which includes sending the modified DNS reply to the virtual server. Additionally, operation 364 includes updating a map entry to indicate the DNS reply has been sent to the virtual server to satisfy at least a portion of a corresponding original DNS query received.

In other words, operation 364 includes updating a map entry with information associated with the DNS reply sent to the virtual server. For example, the map entry may be updated to include the destination IP address, destination port, the original transaction ID, a translated transaction ID, and any other desired information.

Operation 366 further includes determining whether all DNS queries assigned to the SNAT port that the DNS reply was received along have been fully satisfied. As noted above, each SNAT port may be used to facilitate multiple connections to a same destination IP address and DNS port. Thus, although a DNS reply may be returned along a SNAT port and processed, the SNAT port may also be facilitating a number of other DNS queries.

In response to determining that one or more DNS queries assigned to the SNAT port have not yet been satisfied, method 350 advances to operation 368 where a delay is observed before returning to operation 352. It follows that the operations of method 350 may be repeated any desired number of times to ensure that each DNS query is completed. In some approaches, operation 368 includes observing a time delay involving a predetermined amount of time. In other approaches, a delay may correspond to a number of queries received, replies received, user input, a predetermined condition being met, etc.

Returning to operation 366, it follows that method 300 advances to operation 370 in response to determining that the DNS query has been fully satisfied. There, operation 370 includes releasing the corresponding SNAT port. In other words, operation 370 includes erasing the SNAT port and indicating it is available to accommodate a new query that does not correspond to one of the existing SNAT ports, e.g., as described herein. These available (e.g., empty) SNAT ports may be accumulated in a buffer, referenced in a lookup table, identified using one or more flags, updated to include different information in the header thereof (e.g., see FIG. 4), etc.

It again follows that implementations herein are able to maintain a sufficient number of SNAT ports to satisfy DNS queries in real-time as they are received. This desirably avoids SNAT port exhaustion, and reduces processing backlog as well as the number of received requests that fail. The improvement is achieved at least in part as a result of using each SNAT port to facilitate multiple connections to a same destination IP address and DNS port. Additionally, control plane communication is reduced, thereby improving datapath performance.

Figure 5:
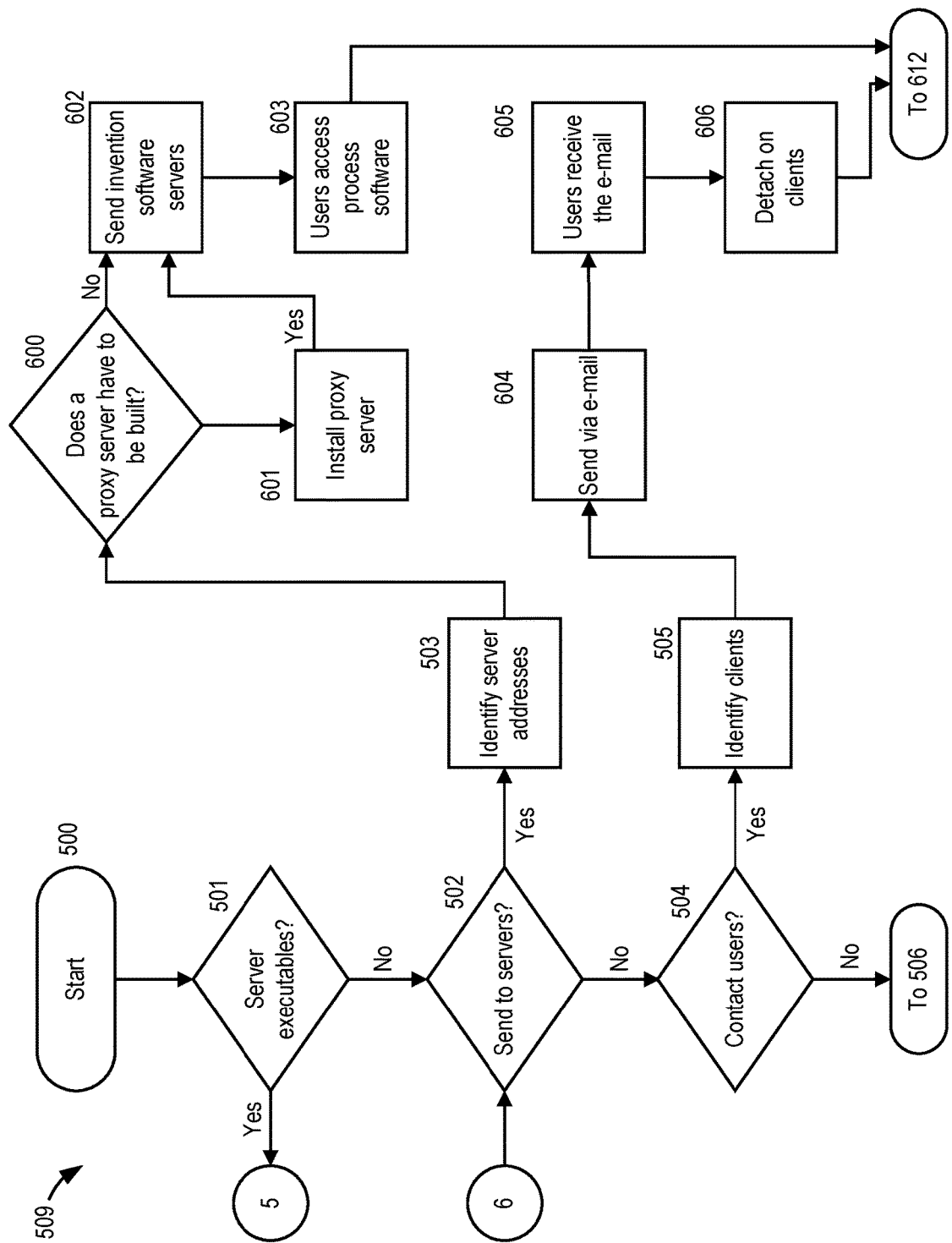
FIG. 5 is a flowchart of a method, in accordance with one approach.
Figure 5:
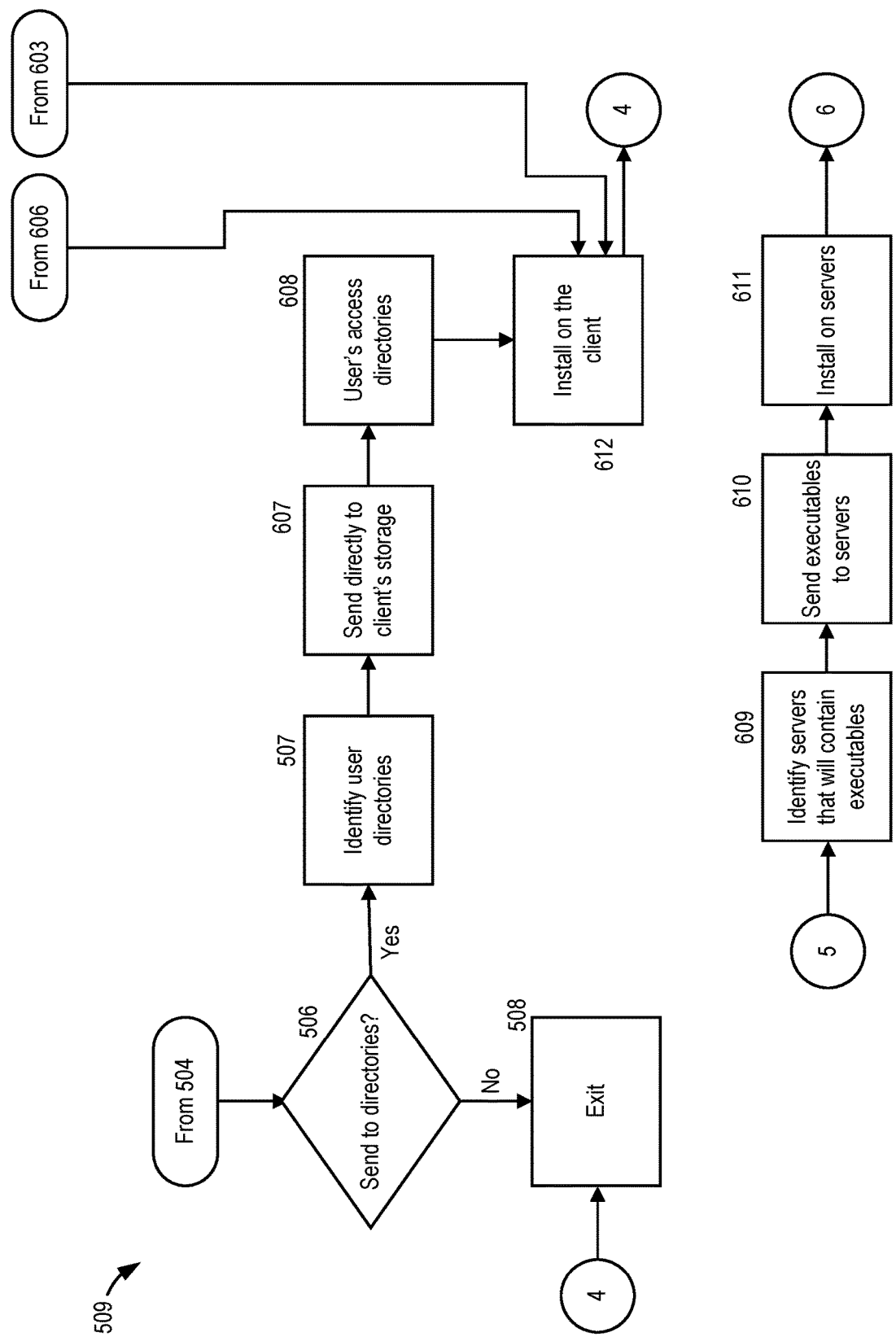

Now referring to FIG. 5, a flowchart of a method 509 is shown according to one approach. The method 509 may be performed in accordance with the present invention in any of the environments depicted in FIGS. 1-4, among others, in various approaches. Of course, more or fewer operations than those specifically described in FIG. 5 may be included in method 509, as would be understood by one of skill in the art upon reading the present descriptions.

Each of the steps of the method 509 may be performed by any suitable component of the operating environment. For example, in various approaches, the method 509 may be partially or entirely performed by a processing circuit, e.g., such as an IaC access manager, or some other device having one or more processors therein. The processor, e.g., processing circuit(s), chip(s), and/or module(s) implemented in hardware and/or software, and preferably having at least one hardware component, may be utilized in any device to perform one or more steps of the method 509. Illustrative processors include, but are not limited to, a central processing unit (CPU), an application specific integrated circuit (ASIC), a field programmable gate array (FPGA), etc., combinations thereof, or any other suitable computing device known in the art.

While it is understood that the process software associated with maintaining a sufficient number of SNAT ports to satisfy DNS queries in real-time as they are received may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

With continued reference to method 509, step 500 begins the deployment of the process software. An initial step is to determine if there are any programs that will reside on a server or servers when the process software is executed (501). If this is the case, then the servers that will contain the executables are identified (609). The process software for the server or servers is transferred directly to the servers' storage via FTP or some other protocol or by copying though the use of a shared file system (610). The process software is then installed on the servers (611).

Next, a determination is made on whether the process software is to be deployed by having users access the process software on a server or servers (502). If the users are to access the process software on servers, then the server addresses that will store the process software are identified (503).

A determination is made if a proxy server is to be built (600) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (601). The process software is sent to the (one or more) servers either via a protocol such as FTP, or it is copied directly from the source files to the server files via file sharing (602). Another approach involves sending a transaction to the (one or more) servers that contained the process software, and have the server process the transaction and then receive and copy the process software to the server's file system. Once the process software is stored at the servers, the users via their client computers then access the process software on the servers and copy to their client computers file systems (603). Another approach is to have the servers automatically copy the process software to each client and then run the installation program for the process software at each client computer. The user executes the program that installs the process software on his client computer (612) and then exits the process (508).

In step 504 a determination is made whether the process software is to be deployed by sending the process software to users via e-mail. The set of users where the process software will be deployed are identified together with the addresses of the user client computers (505). The process software is sent via e-mail (604) to each of the users' client computers. The users then receive the e-mail (605) and then detach the process software from the e-mail to a directory on their client computers (606). The user executes the program that installs the process software on his client computer (612) and then exits the process (508).

Lastly, a determination is made on whether the process software will be sent directly to user directories on their client computers (506). If so, the user directories are identified (507). The process software is transferred directly to the user's client computer directory (607). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (608). The user executes the program that installs the process software on his client computer (612) and then exits the process (508).

It will be clear that the various features of the foregoing systems and/or methodologies may be combined in any way, creating a plurality of combinations from the descriptions presented above.

It will be further appreciated that implementations of the present invention may be provided in the form of a service deployed on behalf of a customer to offer service on demand.

The descriptions of the various implementations of the present invention have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to best explain the principles of the implementations, the practical application or technical improvement over technologies found in the marketplace, or to enable others of ordinary skill in the art to understand the implementations disclosed herein.

What is claimed is:

1. A computer-implemented method, comprising:
   in response to receiving a domain name system (DNS) query, determining whether a destination for the DNS query corresponds to an existing source network address translation (SNAT) port; and
   in response to determining that the destination for the DNS query corresponds to an existing SNAT port:
      modifying the DNS query to incorporate the existing SNAT port,
      updating a map entry corresponding to the existing SNAT port, the updated map entry correlating (i) the DNS query and at least one additional DNS query, with (ii) a shared Internet protocol (IP) address and shared destination port, and
      causing the modified DNS query to be satisfied.

2. The computer-implemented method of claim 1, wherein modifying the DNS query to incorporate the existing SNAT port includes referencing (i) an Internet protocol (IP) address, and (ii) a destination port, that correspond to the existing SNAT port, wherein the IP address and the destination port are referenced by one or more additional DNS queries.

3. The computer-implemented method of claim 2, comprising:

in response to determining that the destination for the DNS query does not correspond to an existing SNAT port, causing a new SNAT port to be allocated;

causing a new map entry to be created, wherein the new map entry includes a source IP address and a source port of the new SNAT port; and modifying the DNS query to reference the source IP address and the source port of the new SNAT port.

4. The computer-implemented method of claim 1, comprising:

in response to receiving a DNS reply, using a source of the DNS reply to identify a corresponding DNS query destination;

modifying the DNS reply to reference (i) an Internet protocol (IP) address, and (ii) a destination port, that correspond to a virtual server associated with the identified DNS query destination; and sending the modified DNS reply to the virtual server, wherein the virtual server is implemented at an edge node of a distributed system.

5. The computer-implemented method of claim 1, comprising:

in response to determining that the DNS query has been satisfied, determining whether any unsatisfied DNS queries also correspond to the existing SNAT port; and in response to determining that no unsatisfied DNS queries correspond to the existing SNAT port, releasing the existing SNAT port.

6. The computer-implemented method of claim 1, wherein causing the modified DNS query to be satisfied includes:

sending the modified DNS query to a virtual server; and in response to determining that a predetermined amount of time has passed since the DNS query was sent to the virtual server without receiving a response, releasing the existing SNAT port.

7. The computer-implemented method of claim 1, wherein causing the modified DNS query to be satisfied includes:

causing the DNS query and the at least one additional DNS query to be performed in parallel, and using the shared IP address and shared destination port.

8. A computer program product, comprising a computer readable storage medium having program instructions embodied therewith, the program instructions readable by a processor, executable by the processor, or readable and executable by the processor, to cause the processor to:

in response to receiving a domain name system (DNS) query, determine whether a destination for the DNS query corresponds to an existing source network address translation (SNAT) port; and in response to determining that the destination for the DNS query corresponds to an existing SNAT port:
modify the DNS query to incorporate the existing SNAT port,
update a map entry corresponding to the existing SNAT port, the updated map entry correlating (i) the DNS query and at least one existing DNS query, with (ii) a shared Internet protocol (IP) address and shared destination port, and
cause the modified DNS query to be satisfied.

9. The computer program product of claim 8, wherein modifying the DNS query to incorporate the existing SNAT port includes referencing (i) an Internet protocol (IP) address, and (ii) a destination port, that correspond to the existing SNAT port, wherein the IP address and the destination port are referenced by one or more additional DNS queries.

10. The computer program product of claim 9, wherein the program instructions are readable and/or executable by the processor to cause the processor to:

in response to determining that the destination for the DNS query does not correspond to an existing SNAT port, cause a new SNAT port to be allocated;

cause a new map entry to be created, wherein the new map entry includes a source IP address and a source port of the new SNAT port; and modify the DNS query to reference the source IP address and the source port of the new SNAT port.

11. The computer program product of claim 8, wherein the program instructions are readable and/or executable by the processor to cause the processor to:

in response to receiving a DNS reply, use a source of the DNS reply to identify a corresponding DNS query destination;

modify the DNS reply to reference (i) an Internet protocol (IP) address, and (ii) a destination port, that correspond to a virtual server associated with the identified DNS query destination; and send the modified DNS reply to the virtual server, wherein the virtual server is implemented at an edge node of a distributed system.

12. The computer program product of claim 8, wherein the program instructions are readable and/or executable by the processor to cause the processor to:

in response to determining that the DNS query has been satisfied, determine whether any unsatisfied DNS queries also correspond to the existing SNAT port; and in response to determining that no unsatisfied DNS queries correspond to the existing SNAT port, release the existing SNAT port.

13. The computer program product of claim 8, wherein causing the modified DNS query to be satisfied includes:

sending the modified DNS query to a virtual server; and in response to determining that a predetermined amount of time has passed since the DNS query was sent to the virtual server without receiving a response, releasing the existing SNAT port.

14. A system, comprising:

a processor; and logic integrated with the processor, executable by the processor, or integrated with and executable by the processor, the logic being configured to:

in response to receiving a domain name system (DNS) query, determine whether a destination for the DNS query corresponds to an existing source network address translation (SNAT) port; and in response to determining that the destination for the DNS query corresponds to an existing SNAT port:
modify the DNS query to reference a shared Internet protocol (IP) address and a shared destination port of the existing SNAT port,
update a map entry corresponding to the existing SNAT port, and
cause the modified DNS query to be satisfied in parallel with at least one existing DNS query.

15. The system of claim 14, wherein the modified DNS query and the at least one existing DNS query each reference the shared Internet protocol address and the shared destination port of the existing SNAT port.

16. The system of claim 15, wherein the logic is configured to:

in response to determining that the destination for the DNS query does not correspond to an existing SNAT port, cause a new SNAT port to be allocated;

cause a new map entry to be created, wherein the new map entry includes a source IP address and a source port of the new SNAT port; and modify the DNS query to reference the source IP address and the source port of the new SNAT port.

17. The system of claim 14, wherein the logic is configured to:

in response to receiving a DNS reply, use a source of the DNS reply to identify a corresponding DNS query destination;

modify the DNS reply to reference (i) an Internet protocol (IP) address, and (ii) a destination port, that correspond to a virtual server associated with the identified DNS query destination; and send the modified DNS reply to the virtual server, wherein the virtual server is implemented at an edge node of a distributed system.

18. The system of claim 14, wherein the logic is configured to:

in response to determining that the DNS query has been satisfied, determine whether any unsatisfied DNS queries also correspond to the existing SNAT port; and in response to determining that no unsatisfied DNS queries correspond to the existing SNAT port, release the existing SNAT port.

19. The system of claim 14, wherein causing the modified DNS query to be satisfied includes:

sending the modified DNS query to a virtual server; and in response to determining that a predetermined amount of time has passed since the DNS query was sent to the virtual server without receiving a response:
failing the DNS query, and
releasing the existing SNAT port.

* * * * *